United States Patent
Ansell

(10) Patent No.: US 9,991,970 B2
(45) Date of Patent: Jun. 5, 2018

(54) TRANSFERRING DATA VIA AUDIO LINK

(71) Applicant: Microsoft Technology Licensing, LLC, Redmond, WA (US)

(72) Inventor: Peter John Ansell, Watford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 14/658,739

(22) Filed: Mar. 16, 2015

(65) Prior Publication Data

US 2015/0188643 A1  Jul. 2, 2015

Related U.S. Application Data

(63) Continuation of application No. 13/362,315, filed on Jan. 31, 2012, now Pat. No. 8,996,670.

(51) Int. Cl.

| | |
|---|---|
| *G10L 15/00* | (2013.01) |
| *H04B 11/00* | (2006.01) |
| *G10L 19/00* | (2013.01) |
| *G01L 19/00* | (2006.01) |
| *G10L 15/24* | (2013.01) |
| *G10L 15/26* | (2006.01) |

(52) U.S. Cl.
CPC .............. *H04B 11/00* (2013.01); *G01L 19/00* (2013.01); *G10L 15/24* (2013.01); *G10L 15/265* (2013.01); *G10L 19/00* (2013.01)

(58) Field of Classification Search
CPC ......... G10L 19/00; H04W 8/205; H04B 11/00
USPC ........................................................ 704/235
See application file for complete search history.

(56) References Cited

U.S. PATENT DOCUMENTS

| | | |
|---|---|---|
| 5,945,989 A | 8/1999 | Freishtat et al. |
| 6,385,306 B1 | 5/2002 | Baxter, Jr. |
| 6,389,055 B1 * | 5/2002 | August ................. G06Q 30/02 348/E7.017 |
| 6,922,730 B1 | 7/2005 | Yaple |
| 6,977,921 B1 | 12/2005 | Dolan |
| 7,454,346 B1 | 11/2008 | Dodrill et al. |
| RE42,476 E | 6/2011 | Vaananen |
| 2003/0045341 A1 | 3/2003 | Itkis et al. |
| 2003/0212549 A1 * | 11/2003 | Steentra ................. H04B 11/00 704/201 |
| 2010/0266111 A1 | 10/2010 | Crausaz et al. |

(Continued)

OTHER PUBLICATIONS

"DTMF-Detect", Nov. 16, 2011, Available at: http://www.dialabc.com/sound/detect/explain.html.

(Continued)

*Primary Examiner* — Daniel Abebe

(57) ABSTRACT

Transferring data via audio link is described. In an example a short sequence of data can be transferred between two devices by encoding the sequence of data as an audio sequence. For example, the audio sequence may be a sequence of tones which vary in dependence on the encoded data. The sequence of data may be encoded by a first device and transmitted using a loudspeaker associated with the first device. At least one mobile communications device can be used to capture the audio sequence, for example using a microphone, and to decode the sequence, retrieving the data encoded therein. In some examples the encoded data may comprise a shortened URL or other information which can be used to control one or more aspects of the capture device.

20 Claims, 8 Drawing Sheets

(56) References Cited

U.S. PATENT DOCUMENTS

| | | |
|---|---|---|
| 2011/0246176 A1 | 10/2011 | Arasada |
| 2012/0029917 A1 | 2/2012 | Chang et al. |
| 2013/0108071 A1* | 5/2013 | Huang .................. H04W 4/008 |
| | | 381/77 |
| 2013/0227662 A1* | 8/2013 | Crampton ........... G06F 21/6209 |
| | | 726/6 |
| 2013/0304474 A1 | 11/2013 | Conkie et al. |
| 2014/0108009 A1 | 4/2014 | Chang |

OTHER PUBLICATIONS

"Comparing OTP SMS and NSDT™'s Audio-OTP", Nov. 16, 2011, Available at: http://www.tagattitude.fr/en/publications/doc_download/6-comparison-of-nsdt-and-sms-for-web-authentication.

Cassel, Paul, "The Internet Radio Linking Project", Nov. 16, 2011, Available at: http://www.eham.net/newham/irlp.

* cited by examiner

TRANSFERRING DATA VIA AUDIO LINK

RELATED APPLICATIONS

This application claims priority to U.S. application Ser. No. 13/362,315, filed on Jan. 31, 2012, and entitled "TRANSFERRING DATA VIA AUDIO LINK." This application claims the benefit of the above-identified application, and the disclosure of the above-identified application is hereby incorporated by reference in its entirety as if set forth herein in full.

BACKGROUND

It is becoming increasingly common to transfer small amounts of data between computing devices in different circumstances. For example, two people meeting for the first time may wish to exchange information comprising the URL's of their web pages, email addresses or other contact information. In other examples there may be a need to broadcast information to a large number of people, for example; in shops, at concerts and sporting events.

Current methods of transferring data, for example Near Field Communication (NFC) are not universally implemented and may also be unsuitable for broadcasting data to large numbers of users. Current methods of transferring data may also require that devices are paired or undergo complex handshaking or mutual recognition before data can be transferred. Pairing devices can take time and may be off-putting to users when only a small amount of data is to be transferred. The pairing process is also not always successful.

The embodiments described below are not limited to implementations which solve any or all of the disadvantages of known data transfer systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Transferring data via audio link is described. In an example a short sequence of data can be transferred between two devices by encoding the sequence of data as an audio sequence. For example, the audio sequence may be a sequence of tones which vary in dependence on the encoded data. The sequence of data may be encoded by a first device and transmitted using a loudspeaker associated with the first device. At least one mobile communications device can be used to capture the audio sequence, for example using a microphone, and to decode the sequence, retrieving the data encoded therein. In some examples the encoded data may comprise a shortened URL or other information which can be used to control one or more aspects of the capture device.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a wireless system, the system described is provided as an example and not a limitation. As those skilled in the art will appreciate, the present examples are suitable for application in a variety of different types of data transfer systems.

Figure 1:
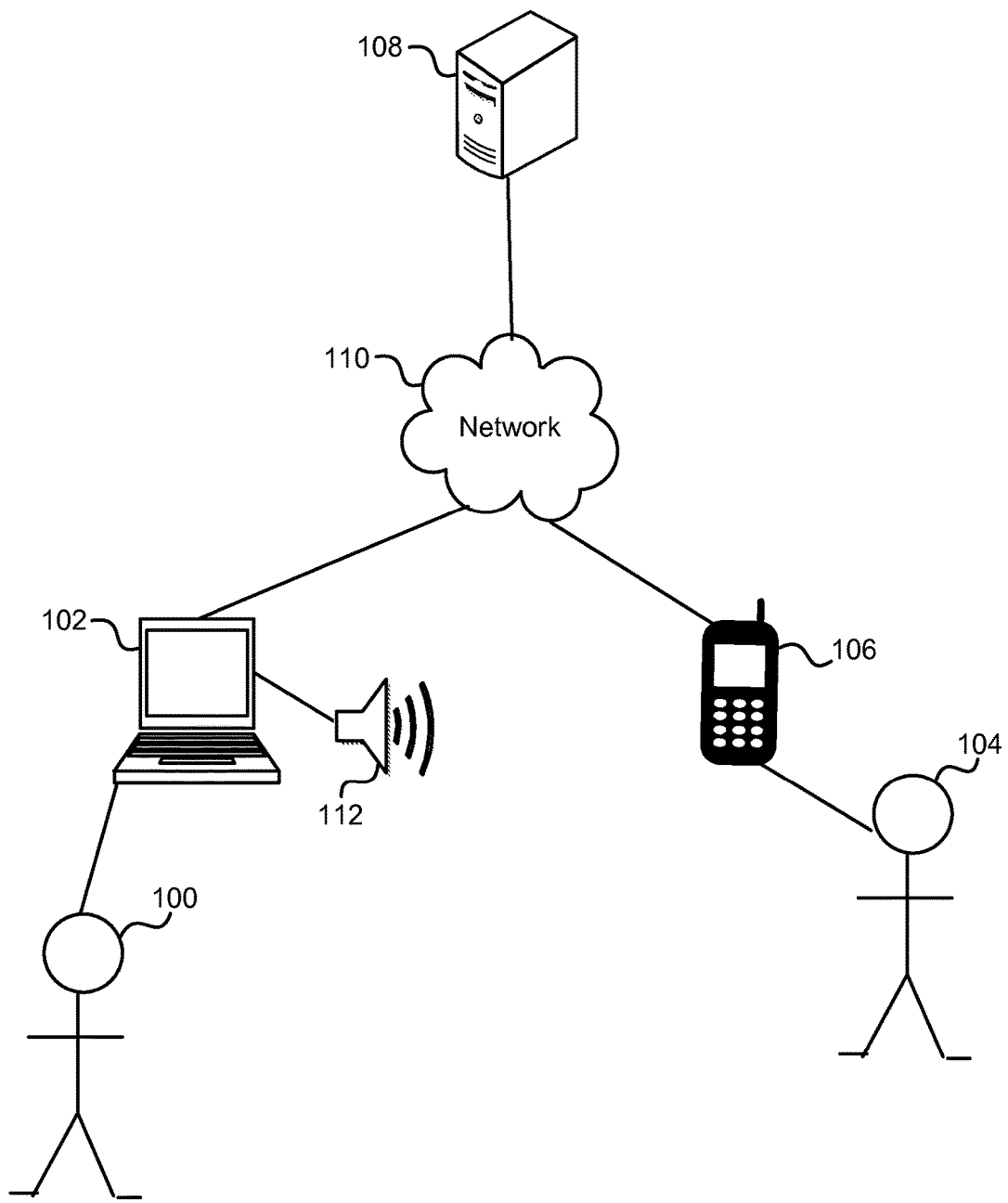
FIG. 1 a schematic diagram of transmitting data over an audio link.

FIG. 1 is a schematic diagram illustrating the transmission of data over an audio link. In an example, a user 100 of a first device 102 wishes to transmit data to a user 104 of a second mobile communications device 106. However, both the first device and the second device may belong to a single user or there may be multiple users with multiple devices. First device 102 can be any appropriate computing device, for example a desktop computer or mobile phone. Transmitting data from the first device to the second device can comprise receiving a data item for transmission at a processor of the first device 102. In various embodiments the data item to be transmitted can be chosen by the user by selecting or copying the data item from a list of data items, or typing the data into the first device 102 using a touch-screen or keyboard. The data item may comprise a URL, email address, phone number, voucher, timing information, business card, GPS or other location information or other relatively small amount of data.

In some examples, rather than sending the data item directly to the second device, the first device can transmit the data item to a remote device (for example remote device 108) via an input/output interface. The remote device 108 may be accessible via the internet 110 or other network, for example a Local Area Network (LAN) or Wide Area Network (WAN) using a wired or wireless connection. The remote device can be a file server or other computing device on which a data item can be stored at a database. In an example the remote device may be a cloud computing service on which one or more of the users 100, 104 have an account.

Transmitting the data item may comprise uploading the data item to the remote device. The data item can be stored at the remote device. For example the remote device may store the data item in a list of data items or in another accessible format. The remote device generates a data token which is uniquely associated with the data item. The data token can be significantly smaller in size than the data item. The token can be in the form of an identifier for the data item that is unique to the remote device. For example the data token can be comprised of a Globally Unique Identifier (GUID), e.g. a 64 or 128 bit GUID. The data token is transmitted to the first device 102 by the remote device 108.

By uploading the data item to the remote device 108 and receiving a unique data token in return the amount of data that has to be transferred from the first device to the second device is significantly reduced. This can improve the speed of transfer and also the security as there is less likelihood of a short transmission being intercepted intentionally by unauthorized eavesdropping than a longer sequence.

The first device receives the data token and encodes the information as an audio sequence. For example, an audio link may be a sequence of musical notes or other tones suitable for transmission as a pressure wave through a medium (such as air). The audio sequence can be transmitted through a loudspeaker 112 for capture by a microphone at a second device 106. The second device can be a mobile communications device or other personal computing device which is arranged to capture an audio sequence played through a loudspeaker at the first, transmitting, device 102. The audio sequence can be captured by the second device 106 using a microphone or other audio capture device. A processor at the second device 106 can be arranged to decode the audio sequence and extract the data token encoded therein. The received data token can be stored at a storage device which is integral to or in communication with the second device 106.

The processor can be arranged to control a display of the second device 106 in dependence on the received data token. For example, the second device can transmit the data token to the remote device, and responsive to this the remote device can send the data item back to the second device. The second device can then display the data item to the user. For example, if the data item is a uniform resource locator (URL) of a webpage, then the second device can be arranged to display the webpage of that URL.

In an example, two people may wish to exchange contact information, for example an email address or link to a social networking page. The first user 100 uploads the data to the remote device 108 and receives a data token in return which may be an integer or other identifier. The data token is encoded as an audio sequence and broadcast using a loudspeaker. The audio sequence is captured at the second device using a microphone and decoded in order to obtain the data token. The user of the second device can then use the data token to access the contact information from the remote device.

In another example, there may be a desire to broadcast information to a large number of users. For example a promoter may wish to broadcast information to an audience at a concert, such as a link to a performer's website or a shop may wish to broadcast special offers or vouchers to customers. The information can be stored at a remote device and an audio sequence broadcast to multiple users of mobile communication devices simultaneously, that when captured and decoded allows the users to access the information from the remote device. In other examples the data item may comprise timing or location information.

Encoding the data token as an audio sequence may comprise encoding the data as a dual tone multi-frequency (DTMF) signal. In other examples the data token may be encoded as a musical sequence. For example the data token may be used a pseudo random seed, and pseudo-random musical phrases can be selected or generated based on the seed and combined together to form a musical composition. Any other form of appropriate encoding may also be used. The audio sequence may denote different parts of the encoded data using frequency modulation or amplitude modulation. For example, each bit of the data token to be encoded may be encoded at a different frequency or amplitude. The data token can then be broadcast by playing the audio sequence through a loudspeaker in communication with the first device. The audio sequence may be played once or may be played a number of times. For example the signal may be looped indefinitely or a specified number of times.

The audio transmission need not take place immediately after the token is received. The token may be received and stored, or encoded as an audio sequence and stored for broadcast at a later time. The receiving device can upload the token to the remote device and receive the data item in return at a later time. Therefore it is not essential that either the transmitting device or the receiving device have access to network connections at the time the audio sequence is broadcast.

In various embodiments where the transmitting device and the receiving device have no network access the sending device may create a token comprising an identifier and cryptographic signature and encode the token as an audio sequence. When network access is obtained the user of the transmitting device can upload the data token, cryptographic signature and the data item to the remote device.

The receiving device can connect to the remote device via the network when network access is obtained and match the data token and cryptographic signature to obtain the data item. The use of a cryptographically signed token ensures the receiver that the data has been uploaded by the intended sender.

Figure 2:
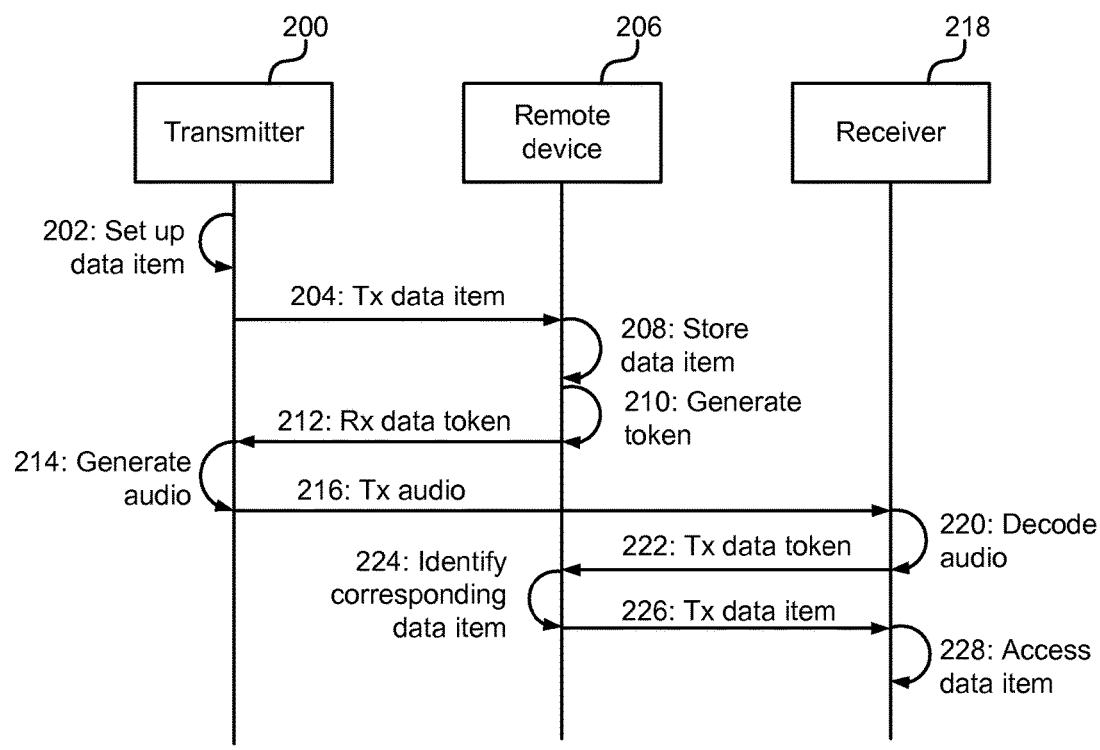
FIG. 2 is a signal chart for an example method of transferring data via an audio link.

FIG. 2 is a signal chart for an example method of transferring data via an audio link. A user of a transmitting device 200 (for example first device 102), sets up 202 a data item. Setting up the data item may comprise copying or otherwise forming a URL or selecting a file or other information to be transmitted. The data item is transmitted 204 to a remote device 206 (for example remote device 108). The data item can be stored 208 at the remote device. Storing the data item at the remote device can comprise storing the data item in a list of items or a data table stored at the remote device which can be accessed at a later time.

An integer or other data token associated with the data item can be generated 210. For example a random number generator may be used to generate an integer or string of integers associated with the data item to be used as the data token. The data token can be received 212 at the transmitting device 200 from the remote device 206.

The transmitting device uses the data token to generate 214 an audio sequence. In an embodiment generating the audio sequence may comprise using touch tone DTMF sequences to code the messages. In some examples the audio sequence may additionally comprise a wrapper arranged to identify the start and/or the end of the data token. The wrapper may be comprised of a header and/or a footer to the encoded message. For example, if the data token is encoded in DTMF as the tones 1234 the header may comprise the tones AB and the footer may comprise the tones CD, making the complete audio sequence AB1234CD.

In various other examples the transmitting device may generate a musical composition using the data token as a seed value. The seed value may be used to pseudo-randomly pick musical phrases to be combined together in a composition. In examples where the audio sequence is to be transmitted to a large number of receivers, for example when data tokens are being broadcast in shops, at sports arenas, or in concerts a musical composition may be less intrusive to receivers of the information.

The transmitting device 200 transmits 216 the audio sequence through a loudspeaker connected to or integral with the wireless device for capture at a receiving device 218 (for example second device 106). In various embodiments the audio sequence may be in a frequency range which is typically audible to humans (20 Hz-20 kHz), at infrasound frequencies (<20 Hz) or at ultrasound frequencies (>20 kHz) or a combination of audible and inaudible frequencies.

The receiving device 218 decodes 220 the audio sequence to obtain the original data token. The receiving device 218 can transmit 222 the data token to the remote device 206. The remote device may use a lookup table or other form of database to identify 224 the data item associated with the data token. The data item can be transmitted 226 to the receiving device 218 by the remote device 206. The receiving device 218 can then access 228 the data item. In some examples the receiving device 218 may access further data responsive to receiving the data item, e.g. if the data item is a URL of a webpage, the receiving device can be arranged to fetch the webpage and display it to the user.

Figure 3:
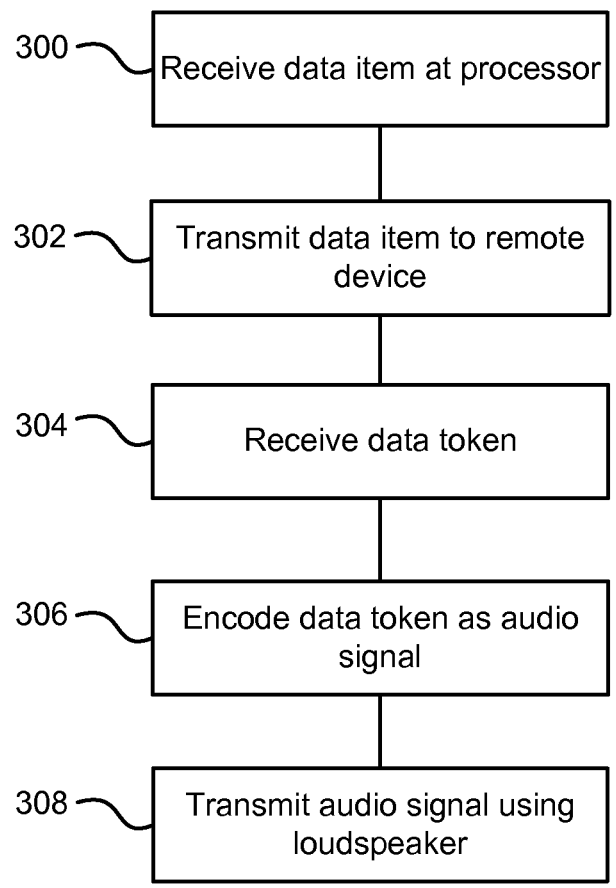
FIG. 3 is a flow diagram of an example method of transmitting data via an audio link.

FIG. 3 is a flow diagram of an example method of transmitting data via an audio link. The method comprises receiving 300 a data item for transmission at a processor of a transmitting device. The transmitting device may be a mobile phone or other portable device (for example a tablet or laptop device) or a non-portable device (for example a personal computer). The data item may comprise a Uniform Resource Identifier (URI) e.g. a Uniform Resource Locator (URL), contact details, timing information, offers, money-off coupons or other vouchers or other relatively small piece of data. The data item is transmitted 302 to a remote device, where it can be stored. The data item may be transmitted using a cellular network, wi-fi, Bluetooth™ or other wired or wireless network connection to the remote device (for example remote device 108).

The transmitting device receives 304 from the remote device a data token which is associated with the data item. In some examples, the data token is a sequence of a few bytes or less which may be in the form of an integer, a uniquely generated key or other identifier for the data item. The data token is encoded 306 as an audio sequence. As noted above the audio sequence may be coded as a DTMF signal or other appropriate coding. The audio sequence is played 308 through loudspeaker for capture by a microphone at the mobile communications device.

Figure 4:
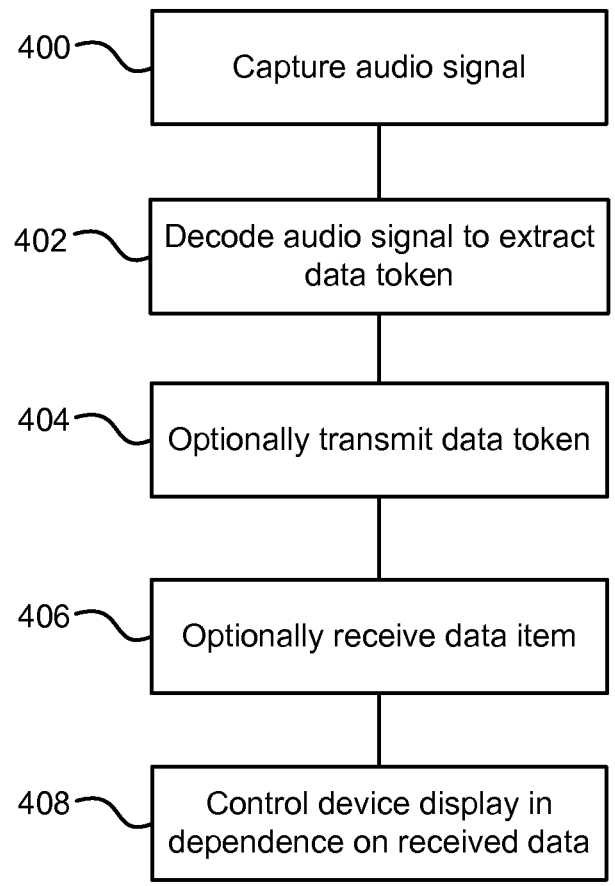
FIG. 4 is a flow diagram of an example method of receiving data via an audio link.

FIG. 4 is a flow diagram of an example method of receiving data via an audio link. A mobile communications device (for example second device 106) can be arranged to capture 400 an audio sequence played through a loudspeaker at a transmitting device. For example the mobile communications device may have a microphone or other audio capture device through which the audio sequence can be captured. The audio sequence may be stored at a data store. The mobile communications device may be arranged to decode 402 the audio sequence and extract a data token encoded therein. For example the mobile communications device may be arranged to determine if the audio sequence is encoded as a DTMF signal or other form of signal and decode the signal. In some examples, the mobile communications device may be arranged to identify when the complete sequence has been captured. In various other examples, the remote device may additionally comprise error correction, such that even if the sequence captured is of low quality, for example if there is a lot of background noise, the data token can still be retrieved.

In some examples, the data token may optionally be transmitted 404 to the remote device and the data item received 406 in return. For example where the data item is a phone number, email address, or other personal information, the mobile communications device can be arranged to control 408 the display to display a user interface enabling the user to save the information or otherwise use it. In another example, if the data item is a URL, the mobile communication device can be arranged to execute a web-browser or other interface which is directed to display information associated with the received URL.

However, in other examples, the received data token may control the features of the mobile communications device directly, without contacting the remote device. For example a camera, camera flash or other light or visual indicator associated with the mobile device may be controlled. For example, in a stadium setting, GPS location sensors in the mobile communication devices can be used to locate each device, and the data tokens used to co-ordinate a "Mexican Wave" using the flashes of smart phone or other device cameras. Similarly, location information can be used to combine many mobile phone screens into a larger visual display configured to display information in dependence on the transmitted data tokens. In further examples, at a music concert broadcast data tokens may comprise information which allows the synchronization of song lyrics on the displays of devices.

In other examples, users may wish to have an additional level of security when transferring the information. For example, when transferring information via an audio link in a crowded place there may be a desire to ensure that even if the audio link is overheard a malicious user will not be able to retrieve the information. In other examples the user transmitting the information may wish to direct different receivers to different information. For example, in a lottery system only a user who transmits a specified code may be directed to the information and all other users may be directed elsewhere.

Various security techniques can be used. For example data tokens may only be valid for a short period of time or produce different results depending on when they are retrieved. For example, this may allow a shop to broadcast "offers of the day". Data tokens may also be made single retrieval or made to return different results depending on the number of previous retrievals that have occurred.

In the example described below with reference to FIG. 5, a receiving device displays a short Personal Identification Number (PIN) which when received by an originator can be used to verify the request. This provides security by ensuring that only the intended, authorized receiving device receives the data item.

Figure 5:
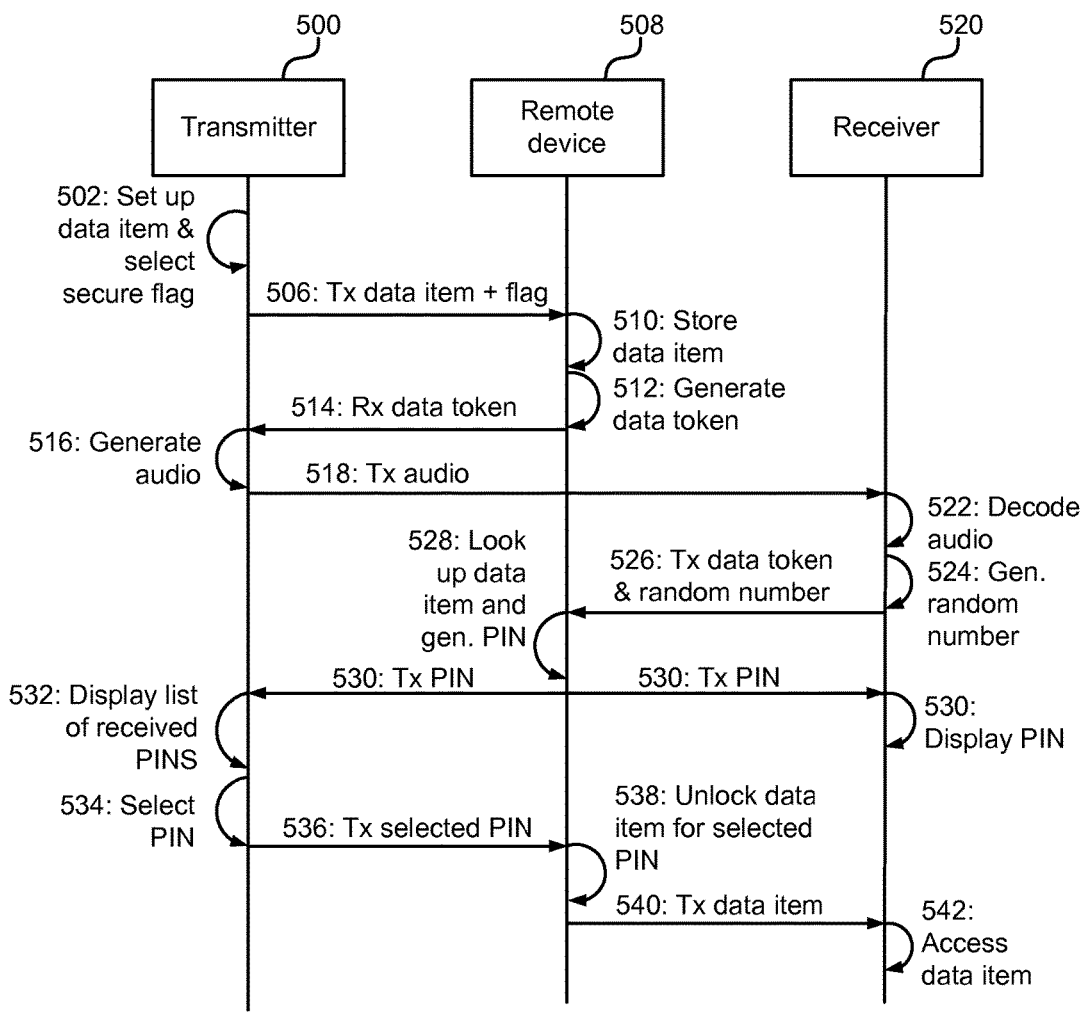
FIG. 5 is a signal chart of an example secure method of transferring data via an audio link.

FIG. 5 is a signal chart of an example secure method of transferring data via an audio link. As described in relation to various embodiments where the transmission is unsecured (for example as described with reference to FIG. 2 above) the user sets up or selects 502 a data item for transmission and also sets 504 a secure flag. For example setting the secure flag may involve selecting an operating mode of the transmitting device 500 that creates a secure transmission environment.

The data item and the secure flag are transmitted 506 to a remote device 508. The data item can be stored 510 at the remote device along with the secure flag. Storing the data item at the remote device can comprise storing the data item in a list of items or data table stored at the remote device which can be accessed at a later time.

An integer or other data token associated with the with the data item can be generated 512. For example a random number generator may be used to generate the data token. The data token can be transmitted 514 from the remote device to the transmitting device 500.

The transmitting device uses the data token to generate 516 an audio sequence. In an embodiment generating the audio sequence may comprise using touch tone DTMF sequences to code the messages. In various other embodiments the transmitting device may generate a musical composition using the data token as a seed value. The transmitting device 518 transmits the audio sequence through a loudspeaker connected to or integral with the wireless device.

The receiving device 520 decodes 522 the audio sequence to obtain the original data token. The receiving device 520 also generates 524 a random or pseudo-random number, which can optionally use the decoded data token as a seed value. The random or pseudo-random number and received data token are transmitted 526 to the remote device 508.

The remote device 508 uses a lookup table or other form of database to identify the data item associated with the data token. As a result of the secure flag being set, the remote device 508 generates 528 a personal identification number (PIN) or other unique identifier using the random number, and transmits 530 the PIN to the receiving device 520 and the transmitting device 500. The receiving device displays 532 the identifier to a user of the receiving device. The user of the receiving device communicates the PIN to the user of the transmitting device or vice versa such that both users are aware of the valid PIN. For example the users may communicate verbally, by SMS, by showing the PIN displayed on the receiving device to the user of the transmitting device, or other appropriate communication means.

If several device received the audio sequence, then each of them would have generated a different random number, resulting in a different PIN for each. The transmitting device can therefore receive several different PINs, each relating to a different receiving device. Because the user of the authorized receiving device has communicated their PIN to the user of the transmitting device, the user of the transmitting device can authorize the remote device to unlock the data item for the authorized receiving device by selecting 534 the correct PIN from the list displayed at their device.

The transmitting device transmits 536 the PIN to the remote device which unlocks 538 the data item for the receiving device which related to the specified PIN number and transmits 540 the data item to the receiving device. The display of the remote device can be controlled in dependence on the received data token to allow the user to access information associated with the data item, for example a webpage or other information. The data item can then be accessed 542 using the receiving device.

In some examples, the random number sent to the remote device by the receiving device can be discarded after the data item has been retrieved. However, in other examples where the data item is for limited distribution, the random number can be retained and may be used to generate and return a retrieval index which indicates the number of people who have requested the data item. This retrieval index may be displayed to the receiver, alongside the data item. In other examples the data item may be displayed to the sender, to allow the sender to monitor the number of times the data item has been accessed.

Figure 6:
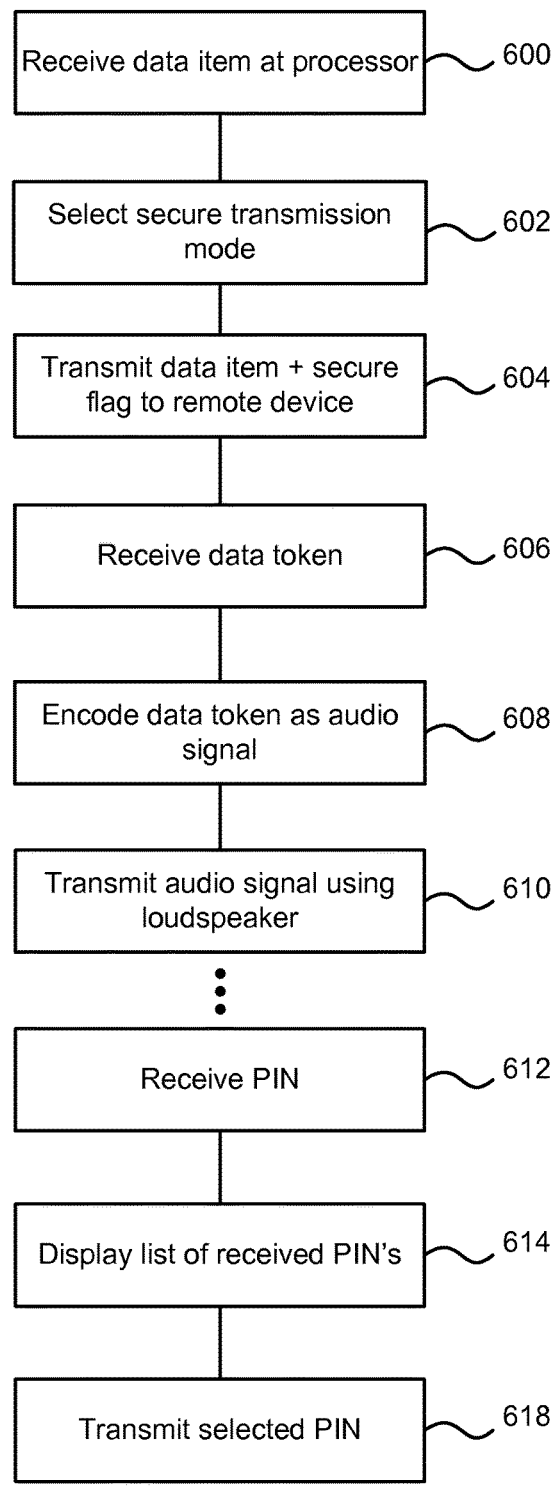
FIG. 6 is a flow diagram of an example method of secure data transmission via an audio link.

FIG. 6 is a flow diagram of an example method of secure data transmission via an audio link. The method comprises receiving 600 a data item for transmission at a processor of a transmitting device. The user of the transmitting device selects 602 a secure mode of transmission which enables the secure transmission mode. The data item and a secure flag are transmitted 604 to a remote device. For example, the data item and secure flag may be transmitted using a cellular network, wi-fi, Bluetooth® or other wired or wireless network connection. The transmitting device receives 606 from the remote device a data token which is associated with the data item. The data token may be an integer, a uniquely generated key or other identifier for the data item. The data token is encoded 608 by the receiving device as an audio sequence. As noted above the audio sequence may be coded as a DTMF signal or other appropriate coding. The audio sequence is played 610 through loudspeaker for capture by a microphone at the mobile communications device. In various embodiments the audio sequence may be played multiple times in a loop or other repeating sequence.

The data item remains secured at the remote device whilst the transmitting device receives 612 one or more PINs from the remote device. A list of received PINs is displayed 614 to the user who is aware of the PIN received by the user of the authorized receiving device. For example, the user of the transmitting device and the receiving device may confer verbally or visually to communicate the PIN sent to the authorized receiving device.

The PIN is transmitted 618 to the remote device which enables the content for the authorized receiving device. Although, in the examples described a PIN is used to secure the data content, any other means of securing the content may be used. For example a shared secret key, symbol, picture or other shared password may be used to secure the data content.

Figure 7:
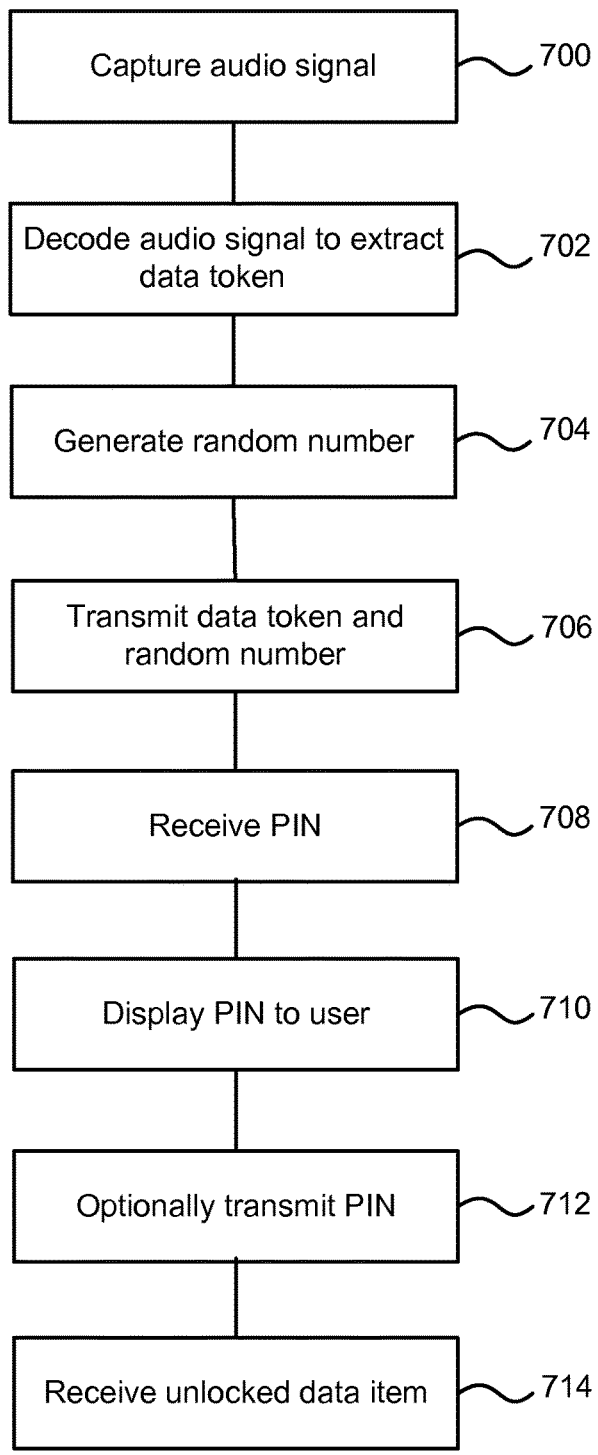
FIG. 7 is a flow diagram of an example method of receiving secure data via an audio link.

FIG. 7 is a flow diagram of an example method of receiving secure data via an audio link. A mobile communications device (for example second device 106) can be arranged to capture 700 an audio sequence played through a loudspeaker at a transmitting device. The mobile communications device may be arranged to decode 702 the audio sequence and extract a data token encoded therein.

The receiving device may comprise a random number generator or other unique identifier and is arranged to generate 704 a random number. The random number can be appended to the data token and transmitted 706 to the remote device. The receiving device receives 708 from the remote device a unique PIN or other unique identifier. The PIN or other unique identifier can be displayed 710 to the user of the mobile communications device. As noted above the shared PIN may be transferred separately to the user of the transmitting device from the user of the receiving device. For example the user of the transmitting device and the receiving device may confer verbally or visually to communicate the PIN. In other examples the PIN may be transferred 712 directly from the receiving device to the transmitting device using a different communication channel, such as SMS.

Once the data item is unlocked at the remote device by the user of the transmitting device the data item can be received 714 by the receiving device. The data item may be a URL or other information and the mobile device can then display a webpage associated with the URL. In another example the data item may be a telephone number or other contact details and the mobile device may be arranged to display the information and ask whether or not the user of the device wishes to store the information.

In various embodiments where there is a lifespan of the data item, for example, when a shop wishes to issues vouchers which have a certain length of validity, the data item may only be retrieved within a specified time limit.

Figure 8:
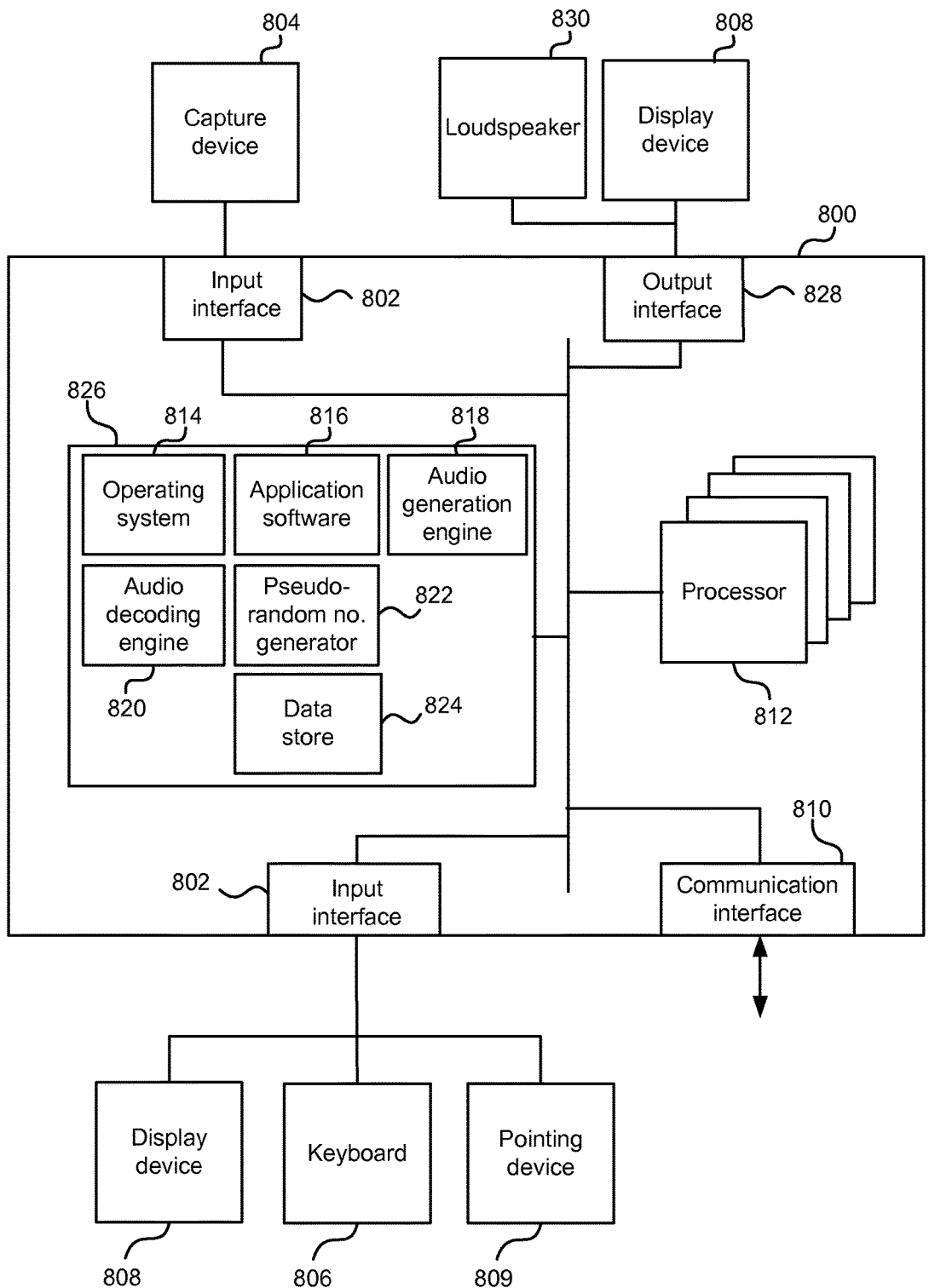
FIG. 8 illustrates an exemplary computing-based device in which embodiments of transferring data via an audio link may be implemented.

FIG. 8 and illustrates various components of an exemplary computing-based devices 800 which may be implemented as any form of a computing and/or electronic device, and in which embodiments of transmitting and receiving audio links may be implemented.

The computing-based device 800 comprises one or more inputs 802 which are of any suitable type for receiving media content, Internet Protocol (IP) input, input from a microphone or other audio capture device 804, keyboard 806 input or input from a touch screen or other display 808 or input from a pointing device 809. In various embodiments, voice recognition or gesture recognition systems may also be used. Display 808 may also be used as an output device. The device also comprises communication interface 810 which may be used to communicate with the remote device or other device.

Computing-based device 800 also comprises one or more processors 812 which may be microprocessors, controllers or any other suitable type of processors for processing computer executable instructions to control the operation of the device in order to transmit and/or receive information via audio links. In some examples, for example where a system on a chip architecture is used, the processors 812 may include one or more fixed function blocks (also referred to as accelerators) which implement a part of the method of transmitting and/or receiving information via audio links in hardware (rather than software or firmware).

Platform software comprising an operating system 814 or any other suitable platform software may be provided at the computing-based device to enable application software 816 to be executed on the device. Additional software or software blocks may be provided. Audio generation engine 818 may be provided to convert data into audio sequences. Audio decoding engine 820 may be provided to convert audio sequences back to data tokens or other data. Pseudo random number generator 822 may be provided for secure data transfer or other integer generation. Computing based device 800 may also be provided with a data store 824. The additional software may be provided in dependence on whether the exemplary computing based device is a transmitting device, a receiving device or whether the device is intended to carry out both transmitting and receiving functions.

The computer executable instructions may be provided using any computer-readable media that is accessible by computing based device 800. Computer-readable media may include, for example, computer storage media such as memory 826 and communications media. Computer storage media, such as memory 826, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 826) is shown within the computing-based device 800 it will be appreciated that the storage may be distributed or located remotely and accessed via a network or other communication link (e.g. using communication interface 810).

An output 828 is also provided. The output may be audio output to a loudspeaker 830 or audio and/or video output to a display system which are integral with or in communication with the computing-based device. The display system may provide a graphical user interface, or other user interface of any suitable type although this is not essential.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of transmitting a data item to a mobile communications device comprising:
   receiving a data item for transmission at a processor;
   transmitting the data item to a remote device;
   receiving from the remote device a data token which is associated with the data item;
   encoding the data token as an audio sequence, at least a portion of the audio sequence being imperceivable to a human ear;
   playing the audio sequence through a loudspeaker for capture by a microphone at the mobile communications device for exchange for a personal identification number (PIN) from the remote device;
   receiving the PIN from the mobile communications device; and
   transmitting the received PIN to the remote device to authorize transmission of the data item from the remote device to the mobile communications device.

2. A method according to claim 1 wherein the data item is one of: a Uniform Resource Identifier (URI), email address, phone number or business card, voucher, GPS information, timing information, song lyrics.

3. A method according to claim 1 wherein the data token received from the remote device is a uniquely generated sequence associated with the data item transmitted to the remote device by a first device.

4. A method according to claim 3 wherein the uniquely generated sequence is a globally unique identifier.

5. A method according to claim 1 wherein the data token is of reduced size relative to the data item.

6. A method according to claim 1 further comprising:
   receiving an identifier at a first device; and
   transmitting the identifier to the mobile communications device.

7. A method according to claim 1 wherein the audio sequence is encoded as a dual tone multi-frequency signal.

8. A method according to claim 1 wherein the audio sequence additionally comprises a wrapper arranged to identify the start and/or the end of the data token.

9. A method according to claim 1 wherein the data token has a uniquely identifying characteristic compared to other data tokens associated with the data item.

10. A mobile communications system comprising;
    a processor arranged to:
      receive a data item for transmission;
      transmit the data item to a remote device;
      receive from the remote device a data token which is associated with the data item;
      receive an identifier from the remote device;
      in response to receiving the identifier from the remote device, encoding the data token as an audio sequence, at least a portion of the audio sequence being imperceivable to a human ear; and
    playing the audio sequence through a loudspeaker for capture by a microphone at a mobile communications device for exchange for a personal identification number (PIN) from the remote device;
    receiving the PIN from the mobile communications device; and
    transmitting the received PIN to the remote device to authorize transmission of the data item from the remote device to the mobile communications device.

11. A mobile communications system according to claim 10 wherein the processor is arranged to receive the identifier based on the data item received at the remote device.

12. A mobile communications system according to claim 10 wherein a first device transmits the identifier to the mobile communications device via an audio transmission.

13. A mobile communications system according to claim 10 wherein the data token comprises an integer and a unique link.

14. A mobile communications system according to claim 10 wherein the data item can only be retrieved within a specified time limit.

15. A mobile communications system according to claim 10 wherein the data token is associated with a website.

16. A mobile communications system according to claim 10 wherein the data token is a URL.

17. A mobile communications system according to claim 10 wherein the data item is one of: a Uniform Resource Identifier (URI), email address, phone number or business card, voucher, GPS information, timing information, song lyrics.

18. A method of transmitting a data item to a mobile communications device comprising;
    receiving a data item for transmission at a processor of a first device;
    transmitting the data item to a remote device;
    receiving from the remote device a data token which is associated with the data item;
    receiving an identifier at the first device;

in response to receiving the identifier from the remote device, encoding the data token as an audio sequence, at least a portion of the audio sequence being imperceivable to a human ear; and playing the audio sequence through a loudspeaker for capture by a microphone at the mobile communications device for exchange for a personal identification number (PIN) from the remote device;

receiving the PIN from the mobile communications device; and transmitting the received PIN to the remote device to authorize transmission of the data item from the remote device to the mobile communications device.

19. A method according to claim 18 wherein the mobile communications device received the identifier from the first device via an audio transmission.

20. A method according to claim 18 further comprising generating a retrieval index which identifies at least the number of requests received for the data item.

\* \* \* \* \*